United States Patent
Holmgren et al.

(10) Patent No.: US 6,739,614 B2
(45) Date of Patent: May 25, 2004

(54) TRAILER HITCH

(76) Inventors: Sven-Erik Holmgren, Övre Malgonäs 28, Vilhelmina (SE), SE-912 92; Tord Jonsson, Floxvägen 13, Kvissleby (SE), SE-862 34

(*) Notice: Subject to any disclaimer, the term of this patent is extended or adjusted under 35 U.S.C. 154(b) by 0 days.

(21) Appl. No.: 10/333,822

(22) PCT Filed: Jul. 16, 2001

(86) PCT No.: PCT/SE01/01635
§ 371 (c)(1),
(2), (4) Date: Apr. 2, 2003

(87) PCT Pub. No.: WO02/07998
PCT Pub. Date: Jan. 31, 2002

(65) Prior Publication Data
US 2003/0160431 A1 Aug. 28, 2003

(30) Foreign Application Priority Data
Jul. 26, 2000 (SE) ................................ 0002771

(51) Int. Cl.[7] ................................ B60D 1/02
(52) U.S. Cl. ................................ 280/515
(58) Field of Search ................ 280/504, 515

(56) References Cited
U.S. PATENT DOCUMENTS

| | | | | |
|---|---|---|---|---|
| 2,237,031 A | * | 4/1941 | Gilmore | 280/513 |
| 2,371,662 A | * | 3/1945 | Winters | 280/506 |
| 2,763,498 A | | 9/1956 | Vaugoyeau | |
| 2,984,502 A | | 5/1961 | Tyrrell | |
| 4,577,885 A | * | 3/1986 | Breu | 280/508 |
| 5,961,141 A | * | 10/1999 | Goel | 280/515 |

FOREIGN PATENT DOCUMENTS

| | | |
|---|---|---|
| DE | 832106 | 8/1955 |
| DE | 933313 | 9/1955 |
| DE | 2458948 A1 | 6/1976 |
| EP | 000490019 A1 * | 12/1990 |
| FR | 2700733 A1 | 7/1994 |

* cited by examiner

Primary Examiner—Kevin Hurley
(74) Attorney, Agent, or Firm—Ware, Fressola, Van der Sluys & Adolphson LLP

(57) ABSTRACT

A trailer hitch for heavy vehicles has a coupling housing arranged on the traction vehicle with a rear, vertical end piece from which extends an upper, forward protruding coupling yoke piece and a lower, forward protruding coupling yoke piece, between which a tow eye on a trailer and a tow ball arranged in the tow eye are intended to be secured by means of a coupling pin running through a hole in the tow ball. A principally vertical wedge (12) is arranged between both coupling yoke pieces (3, 4) in front of the rear end piece (2) and is so designed that the wedging action increases, i.e. the force of the wedge increases, as the wedge is pressed down. An intermediate piece (14), equipped partly with an upper, forward protruding part (15) and partly a lower, forward protruding part (17), is arranged between the wedge (12) and the tow ball (6), whereby the parts are intended to abut against an upper (16) and a lower (18) part of the tow ball. The wedge (12) exhibits a spring device (13) acting on its top and intending to press down the wedge.

6 Claims, 1 Drawing Sheet

TRAILER HITCH

BACKGROUND OF THE INVENTION

1. Technical Field

The present invention concerns a trailer hitch arrangement for heavy vehicles that comprises a tow ball, intended to be arranged between one upper and one lower coupling yoke piece on the traction vehicle, and a tow eye arranged on the outer end of a tow bar fitted to a trailer vehicle, whereby the tow eye and the tow hook are intended to interact when the traction vehicle tows the trailer vehicle.

2. Description of the Background Art

Such trailer hitches are commonplace on the market today. One problem with existing trailer hitches is that there is already inherent free play between the tow ball and tow eye. This fire play increases as the trailer hitch is used, partly through normal wear and partly due to sand, earth and other dirt particles entering into the moving parts of the hitch.

The variation in load caused by the said free play between the tow ball and the tow eye on the trailer vehicle is conveyed throughout the vehicle and is perceived as especially disturbing by the driver. Another considerable disadvantage with the said free play is that the entire power train in the traction vehicle, i.e. propeller shaft, universal joints, engine and gearbox will eventually be damaged by the variation in load.

SUMMARY OF THE INVENTION

The present invention intends to eliminate these problems and offer a new type of trailer hitch that provides a coupling between the traction vehicle and the trailer vehicle without any free play. This is made possible with a trailer hitch of the aforesaid type exhibiting the characteristics specified in the enclosed claims.

BRIEF DESCRIPTION OF THE DRAWING

A preferred embodiment of the invention will be described in more detail with reference to the enclosed drawings, where.

DETAILED DESCRIPTION OF THE INVENTION

Figure 1:
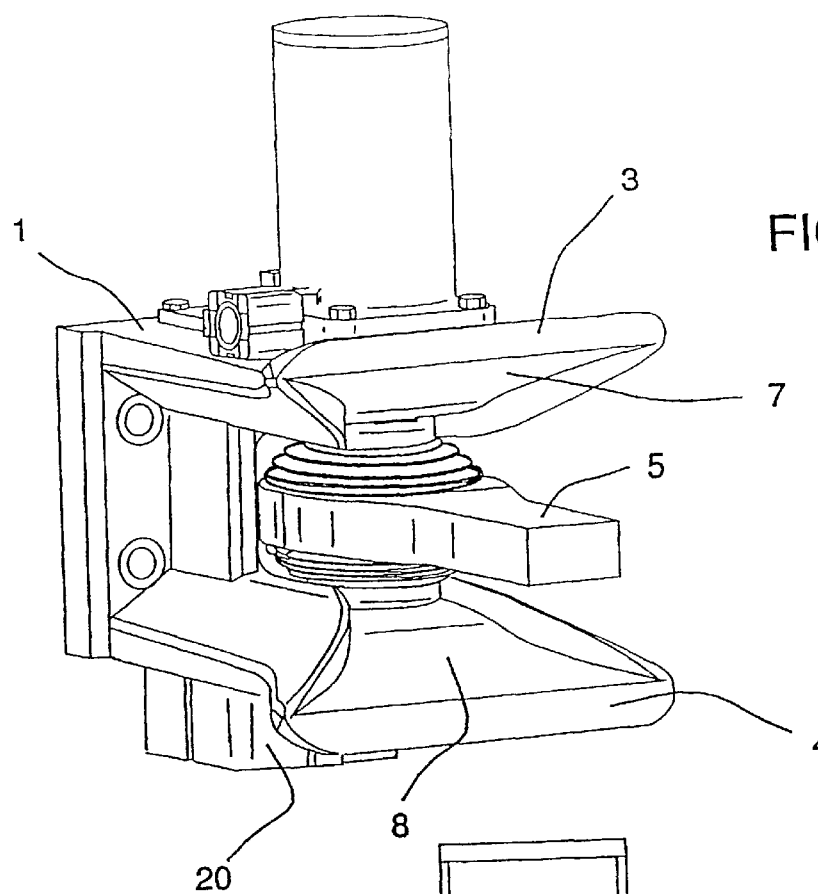
FIG. 1 is a perspective view of the new trailer hitch and FIG. 2 is a vertical cross section of the hitch viewed from one side.
Figure 2:
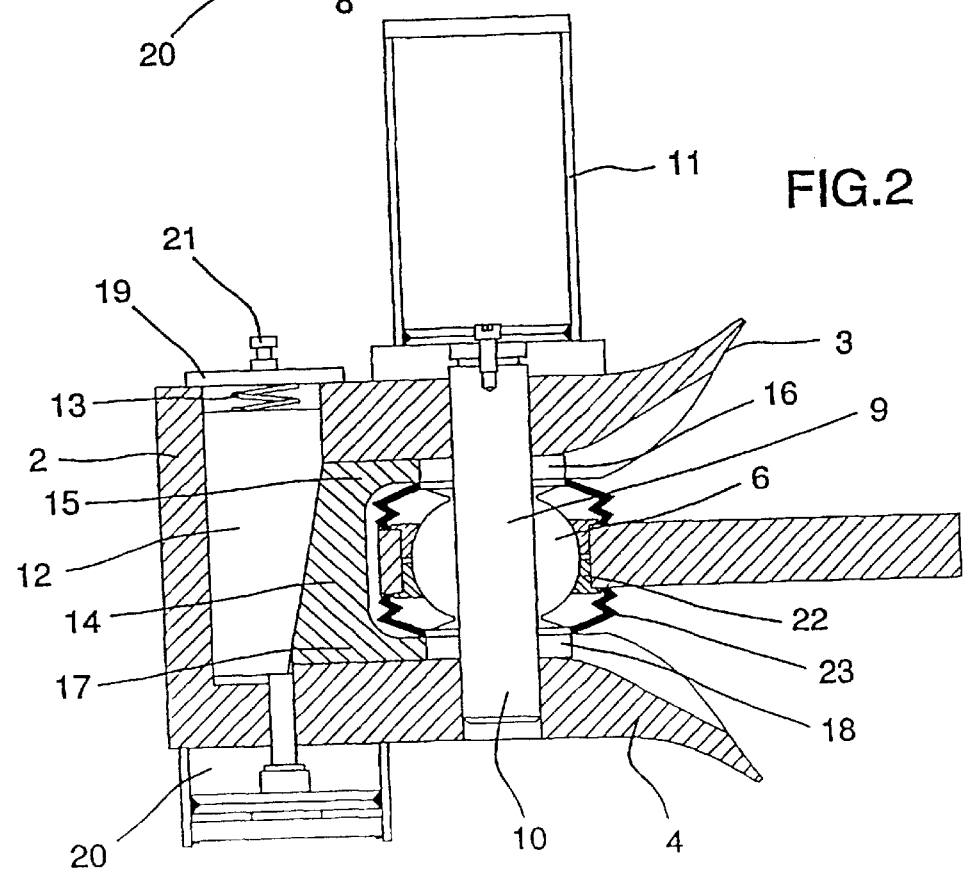

Referring to the drawing, a new trailer hitch is illustrated that exhibits a coupling housing 1, comprising a rear, vertical end piece 2, from which extends an upper, forward protruding coupling yoke piece 3 and a lower, forward protruding coupling yoke piece 4. A tow eye 5 from a trailer and a tow ball 6 arranged inside the tow eye are intended to be contained between these yoke pieces.

Underneath the upper coupling yoke piece 3 and on top of the lower coupling yoke piece 4 are guides 7, 8, which are intended to steer the tow ball correctly to couple the trailer to the traction vehicle. Furthermore, the central part of the tow ball 6 has a vertical hole 9 through it, into which a coupling pin 10 is inserted. This arrangement enables the tow ball 6 and the surrounding tow eye 5 to be securely fastened to the traction vehicle.

The coupling pin 10 is intended to be inserted into the hole 9 of the tow ball 6 and extracted from the same via a suitably driven, e.g. pneumatic or hydraulic, lift cylinder 11 mounted on top of the upper coupling yoke piece 3.

The rear parts of both coupling yoke pieces 3, 4 are joined to the end piece 2. In front of this end piece is a vertical wedge 12 arranged between both yoke pieces. The wedge is so designed that the wedging action increases, i.e. the wedge force in the direction of the tow ball increases, as the wedge is pressed down. This downward pressure is achieved with a spring device 13, which acts on the top of the wedge 12.

The wedge 12 is intended to engage an intermediate piece 14, which exhibits partly an upper, forward protruding part 15, which is intended to abut against the top part 16 of the tow ball 6, and partly a lower, forward protruding part 17, which is intended to abut against the bottom part 18 of the tow ball 6. This means that the wedge 12 and the intermediate piece 14, which is steered with guides in the coupling housing, will press the tow ball 6 against the coupling pin 10.

As the tow ball 6 and thereby the tow eye 5 are pressed against the coupling pin 10 in this way, any free play found in the trailer hitch will disappear. Should any wear arise, the wedge 12 will compensate for it automatically as the spring device 13 will press down the wedge.

The top of the wedge 12 is covered by a wedge cover 19 and its bottom interacts with a pneumatic cylinder 20, which is intended to press up the wedge 12 against the action of the spring device 13 to facilitate uncoupling the traction vehicle. The wedge then abuts against a setscrew 21 arranged in the wedge cover 19.

With the assistance of this setscrew 21, the wedge 12 and thereby also the intermediate piece 14 can thus be adjusted so that the tow ball acquires the correct position in relation to the coupling pin 10 so that the pin can move to a locked position.

Once the coupling pin 10 has locked, the pneumatic cylinder 20 will release, whereby the spring 13 will press down the wedge 12 so that the intermediate piece 14 presses against the tow ball 6.

In order to obtain good support of the tow eye 5 against the tow ball 6, the former is equipped with a bearing shell 22, which is thus applied against the tow ball. To prevent sand and dirt entering the interacting parts of the tow ball and tow eye, they are completely enclosed by a rubber gaiter 23.

The invention is, of course, not limited to the submitted and illustrated embodiment but can be modified within the framework of the following claims.

What is claimed is:

1. Trailer hitch for heavy vehicles comprising:
   (a) a coupling housing arranged on a traction vehicle comprising a rear, vertical end piece from which extends an upper, forward protruding coupling yoke piece and a lower, forward protruding coupling yoke piece, between which a tow eye on a trailer and a tow ball arranged in the tow eye are intended to be secured with a coupling pin running through a hole in the tow ball;
   (b) a principally vertical wedge arranged between the coupling yoke pieces in front of the rear end piece so that wedging action increases as the wedge is pressed down;
   (c) an intermediate piece equipped partly with an upper, forward protruding part and partly with a lower, forward protruding part, arranged between the wedge and the tow ball, whereby the parts are intended to abut against an upper and a lower part of the tow ball; and
   (d) a spring device acting on the wedge and intending to press down the wedge.

2. Trailer hitch according to claim 1, wherein the coupling pin runs through the tow ball and both coupling yoke pieces and is moved in and out of them by a lifting cylinder arranged on the upper coupling yoke piece.

3. Trailer hitch according to claim 2, wherein the lifting cylinder is hydraulic.

4. Trailer hitch according to claim 2, wherein the lifting cylinder is pneumatic.

5. Trailer hitch according to claim 2, further comprising a pneumatic cylinder interacting with a bottom portion of the wedge to press the wedge against the force of the spring device to facilitate uncoupling the traction vehicle from the trailer.

6. Trailer hitch according to claim 1, further comprising a pneumatic cylinder interacting with a bottom portion of the wedge to press the wedge against the force of the spring device to facilitate uncoupling the traction vehicle from the trailer.

* * * * *